United States Patent
Hoshiyama et al.

(10) Patent No.: US 9,628,182 B2
(45) Date of Patent: Apr. 18, 2017

(54) REPEATER, FEEDTHROUGH, AND REPEATER MANUFACTURING METHOD

(71) Applicant: FUJITSU LIMITED, Kawasaki-shi, Kanagawa (JP)

(72) Inventors: Naoto Hoshiyama, Tama (JP); Takahisa Yoshizumi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 14/666,447

(22) Filed: Mar. 24, 2015

(65) Prior Publication Data

US 2015/0295657 A1   Oct. 15, 2015

(30) Foreign Application Priority Data

Apr. 15, 2014   (JP) .................. 2014-083624

(51) Int. Cl.
| | |
|---|---|
| *H04B 10/29* | (2013.01) |
| *G02B 6/50* | (2006.01) |
| *H04B 10/80* | (2013.01) |
| *H02G 15/14* | (2006.01) |
| *H02G 9/02* | (2006.01) |

(52) U.S. Cl.
CPC ............. *H04B 10/29* (2013.01); *G02B 6/506* (2013.01); *H02G 9/02* (2013.01); *H02G 15/14* (2013.01); *H04B 10/80* (2013.01)

(58) Field of Classification Search
CPC ...................................................... H04B 10/29
See application file for complete search history.

(56) References Cited

U.S. PATENT DOCUMENTS

| | | | |
|---|---|---|---|
| 7,481,584 B2 * | 1/2009 | Cairns ................ | H01R 13/5219 385/60 |
| 2007/0292097 A1 | 12/2007 | Sumitani | |
| 2012/0312528 A1* | 12/2012 | Rayssiguier .......... | E21B 17/028 166/244.1 |

FOREIGN PATENT DOCUMENTS

| | | |
|---|---|---|
| EP | 2 541 697 A1 | 1/2013 |
| GB | 2 145 580 A | 3/1985 |
| GB | 2 153 159 A | 8/1985 |
| JP | 4-213408 | 8/1992 |
| JP | 10-107702 | 4/1998 |
| JP | 2002-84648 | 3/2002 |
| JP | 2002-142351 | 5/2002 |
| WO | 2006/097972 A1 | 9/2006 |

OTHER PUBLICATIONS

Extended European Search Report mailed Oct. 15, 2015 in corresponding European Patent Application No. 15160277.8.

\* cited by examiner

*Primary Examiner* — Shi K Li
(74) *Attorney, Agent, or Firm* — Staas & Halsey LLP

(57) ABSTRACT

A repeater includes: a pressure-tight casing to be arranged on seabed or in sea; and a feedthrough having a plurality of lead sections each configured to connect a circuit housed in the pressure-tight casing with a cable outside the pressure-tight casing, wherein the plurality of lead sections include at least a power wire and an electric signal wire, and at least two of the plurality of lead sections have a difference in length from each other.

9 Claims, 17 Drawing Sheets

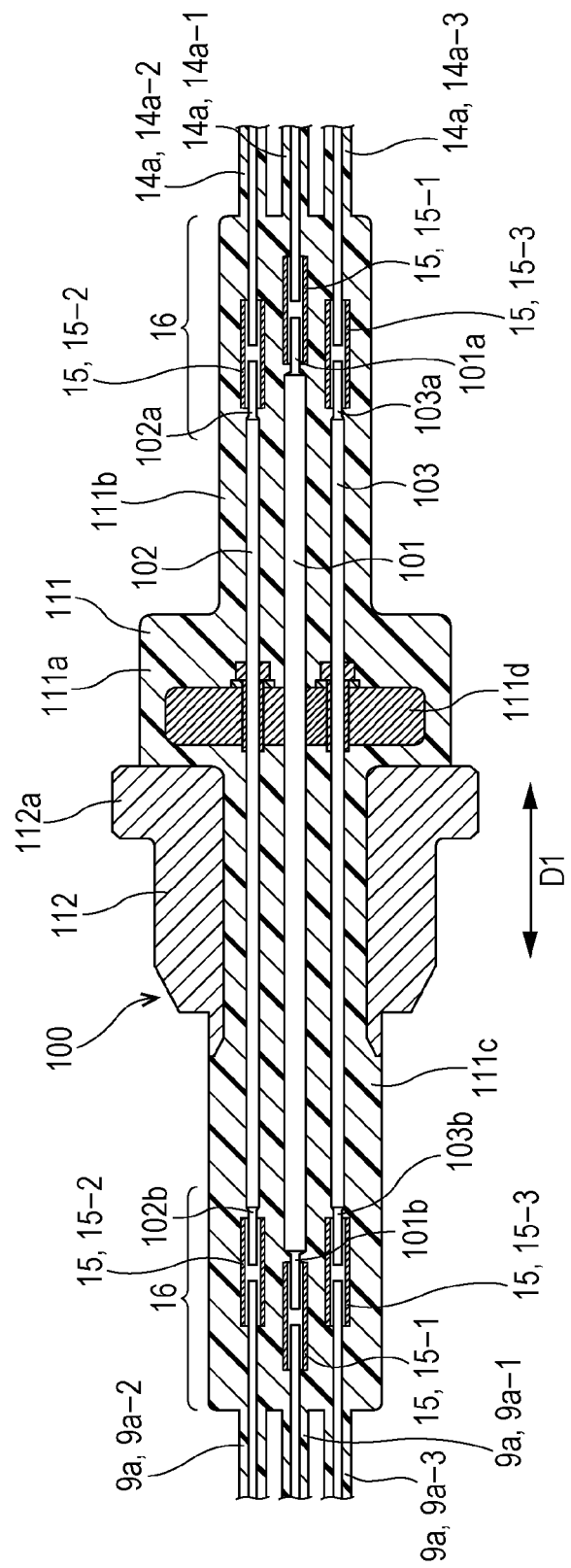

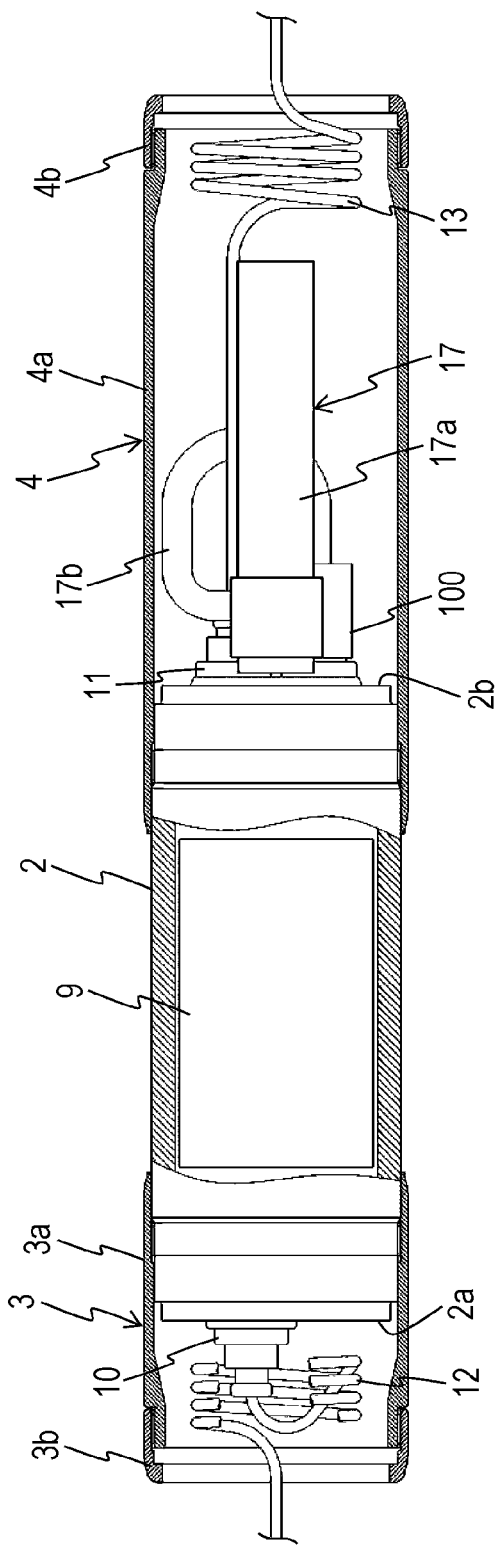

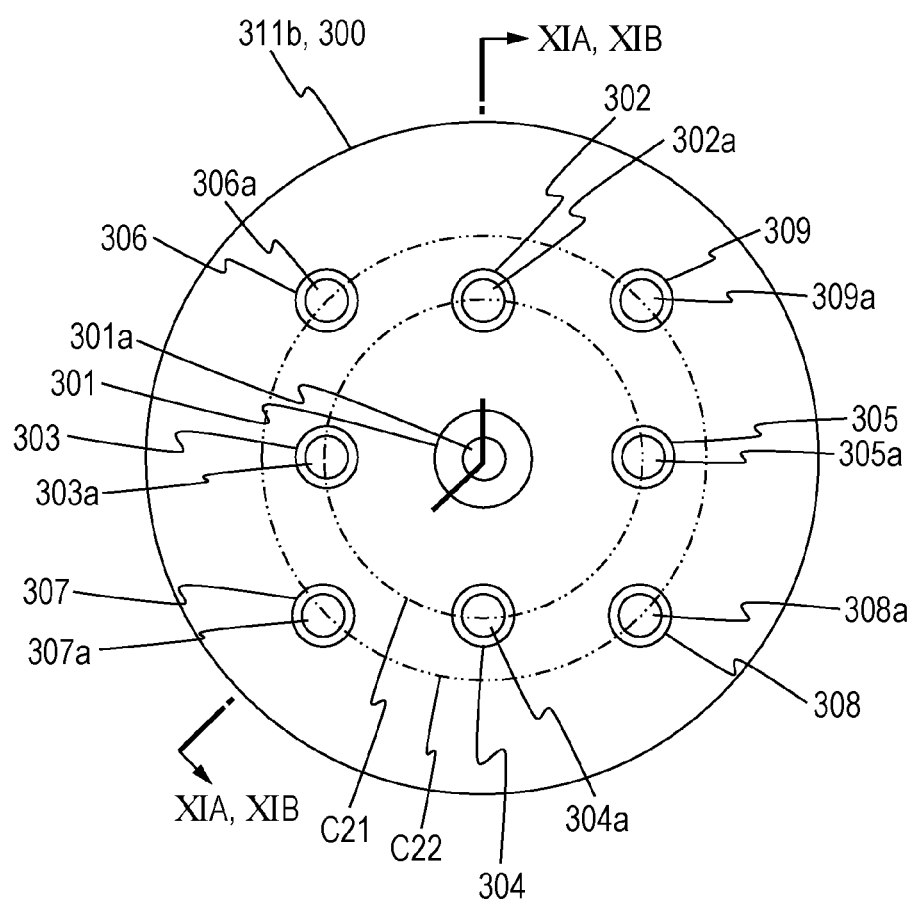

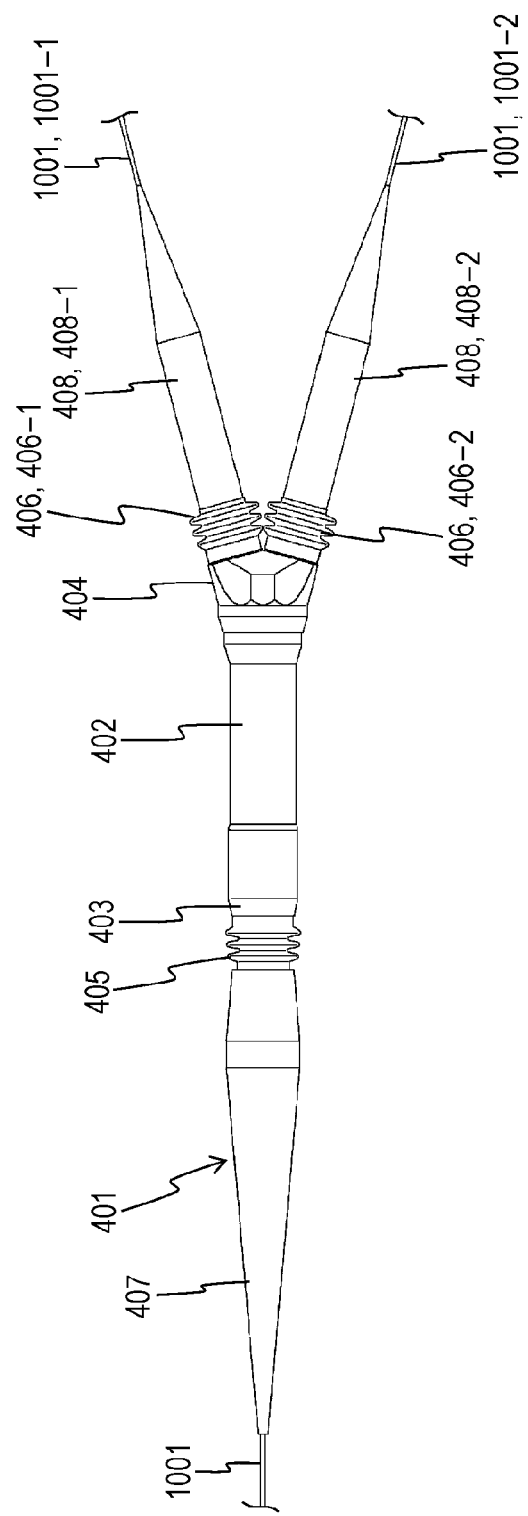

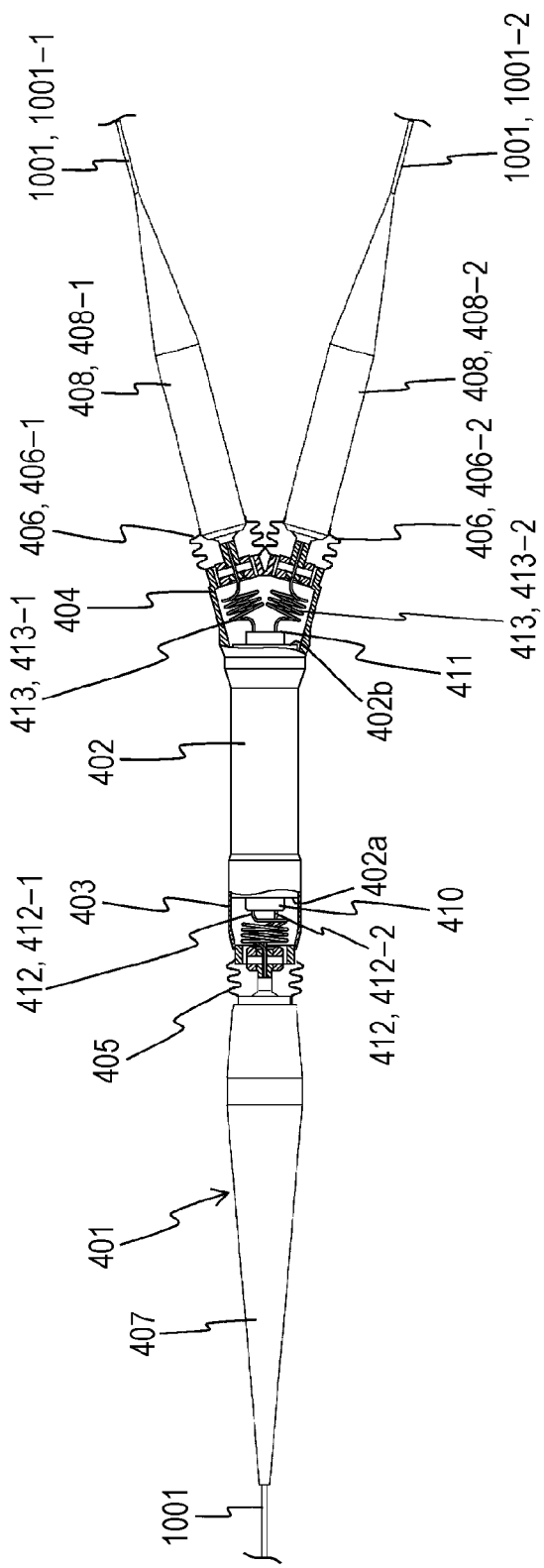

REPEATER, FEEDTHROUGH, AND REPEATER MANUFACTURING METHOD

CROSS-REFERENCE TO RELATED APPLICATION

This application is based upon and claims the benefit of priority of the prior Japanese Patent Application No. 2014-083624, filed on Apr. 15, 2014, the entire contents of which are incorporated herein by reference.

FIELD

The embodiments discussed herein are related to a repeater, a feedthrough arranged in this repeater, and a repeater manufacturing method.

BACKGROUND

As an underwater device to be arranged under water, there have been conventionally known a submarine repeater which amplifies an optical signal transmitted through a submarine cable laid in the sea, a submarine branching unit which branches a submarine cable, and others. An underwater device has a feedthrough to keep water-tightness and air-tightness of a pressure-tight casing (see International Publication Pamphlet No. WO 2006/097972, Japanese Laid-Open Patent Publication No. 2002-142351, and Japanese Laid-Open Patent Publication No. 10-107702, for example).

Today, there is a movement to use a submarine cable as a cable for both telecommunications and monitoring. Such movement is referred to as "Green Repeater" in the International Telecommunication Union Telecommunication Standardization Sector (ITU-T).

A global monitoring network designed to monitor water temperatures, earthquakes, tsunamis, and the like is formed by underwater devices, which are one example of repeaters, equipped with measuring devices for measuring temperatures, pressure, acceleration and the like, for example. In the case where such a measuring device is attached to the exterior of a pressure-tight casing of an underwater device, a feedthrough placed in the pressure-tight casing is provided with a plurality of lead sections to be connected with electric wire cables such as a power wire, a ground wire, and a signal wire.

In this connection, techniques for connecting a cable coated with an insulating material to each of lead sections of a feedthrough include high frequency brazing, resistance brazing, crimping, and the like. After the connection with any of these connection techniques, the connected part is molded by an insulating material and thus is insulated. Note that the connection technique such as brazing, crimping, or the like mentioned above is often adopted instead of soldering, since the solder may melt when a molded part is hot.

A resistance brazing machine is used for resistance brazing work, and a high frequency coil is used for high frequency brazing work. In addition, a crimping tool is used for crimping connection work. If the resistance brazing machine, the high frequency coil, the crimping tool or the like is used with a space for using the tool blocked by the plurality of lead sections, cable connection work is difficult.

Note that a plurality of lead sections are provided to a single feedthrough in cases other than the case described above in which an underwater device is equipped with the measuring devices. For example, a plurality of lead sections may be provided to a single feedthrough also in a case where an underwater device is equipped with a device such as an underwater mateable connector or the like.

SUMMARY

According to an aspect of the embodiments, a repeater includes: a pressure-tight casing to be arranged on seabed or in sea; and a feedthrough having a plurality of lead sections each configured to connect a circuit housed in the pressure-tight casing with a cable outside the pressure-tight casing, wherein the plurality of lead sections include at least a power wire and an electric signal wire, and at least two of the plurality of lead sections have a difference in length from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6B is a VIA/VIB-VIA/VIB sectional view 2 (view illustrating how the electric wire cable is connected) of FIG. 5;

FIG. 7 is a front view illustrating a measuring device and the like in a variation of the first embodiment;

FIG. 12 is a view illustrating a lead section (9-core) in a third embodiment;

FIG. 13 is a front view illustrating a submarine branching unit according to a fourth embodiment;

FIG. 14 is a partial sectional front view of the submarine branching unit according to the fourth embodiment.

DESCRIPTION OF EMBODIMENTS

A repeater, a feedthrough and a repeater manufacturing method according to embodiments of the present disclosure are described hereinafter. Note that in the embodiment, a submarine repeater 1, which is an underwater device, is described as an example of a "repeater", and a submarine branching unit 401, which is an underwater device, is described. In addition, as an example of a "feedthrough", feedthroughs for an electric wire 100, 200, 300 and feedthroughs for an optical fiber 410, 411 are described in the embodiment.

Figure 1:
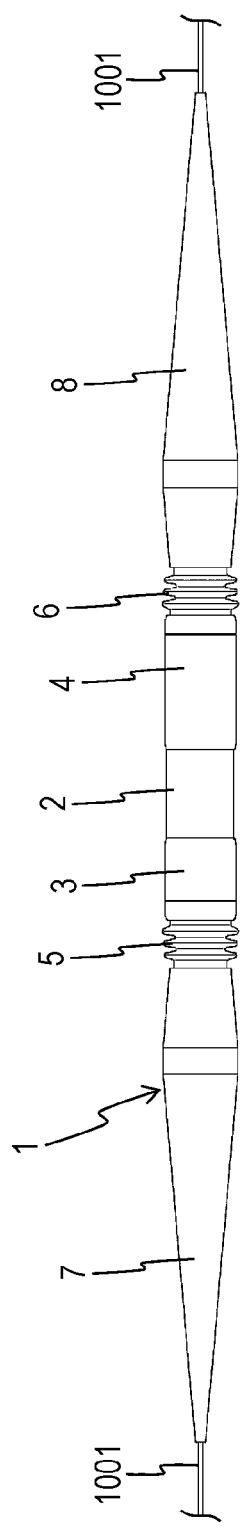
FIG. 1 is front view illustrating a submarine repeater according to a first embodiment.

FIG. 1 is a front view illustrating the submarine repeater 1 of the first embodiment.

Figure 2:
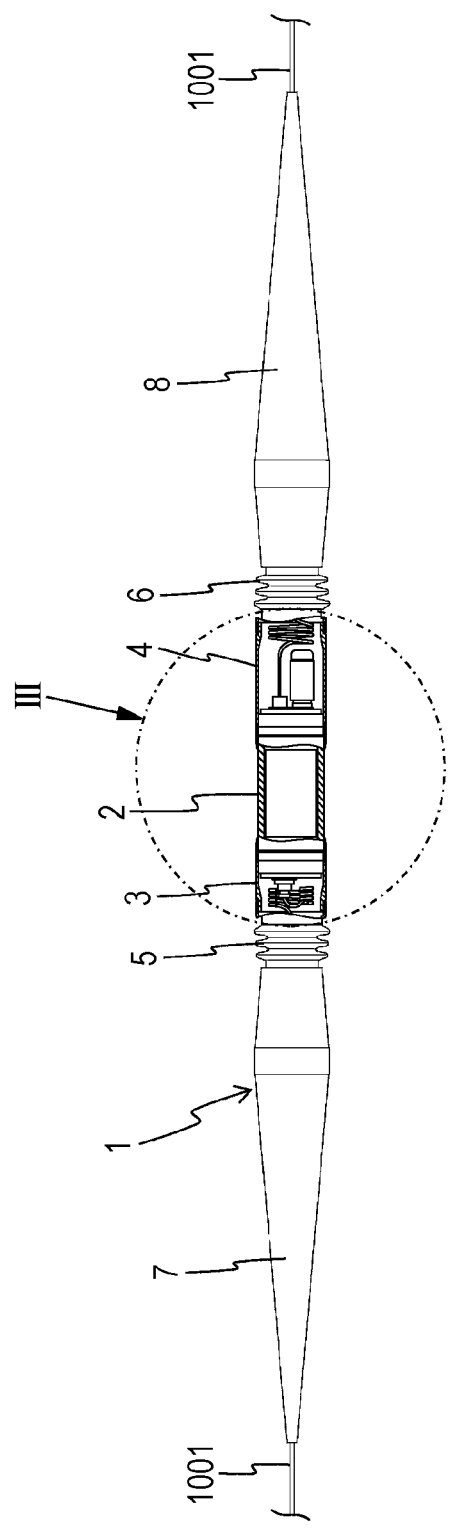
FIG. 2 is a partial sectional front view illustrating the submarine repeater according to the first embodiment.

FIG. 2 is a partial sectional front view illustrating the submarine repeater 1 according to the first embodiment.

Figure 3:
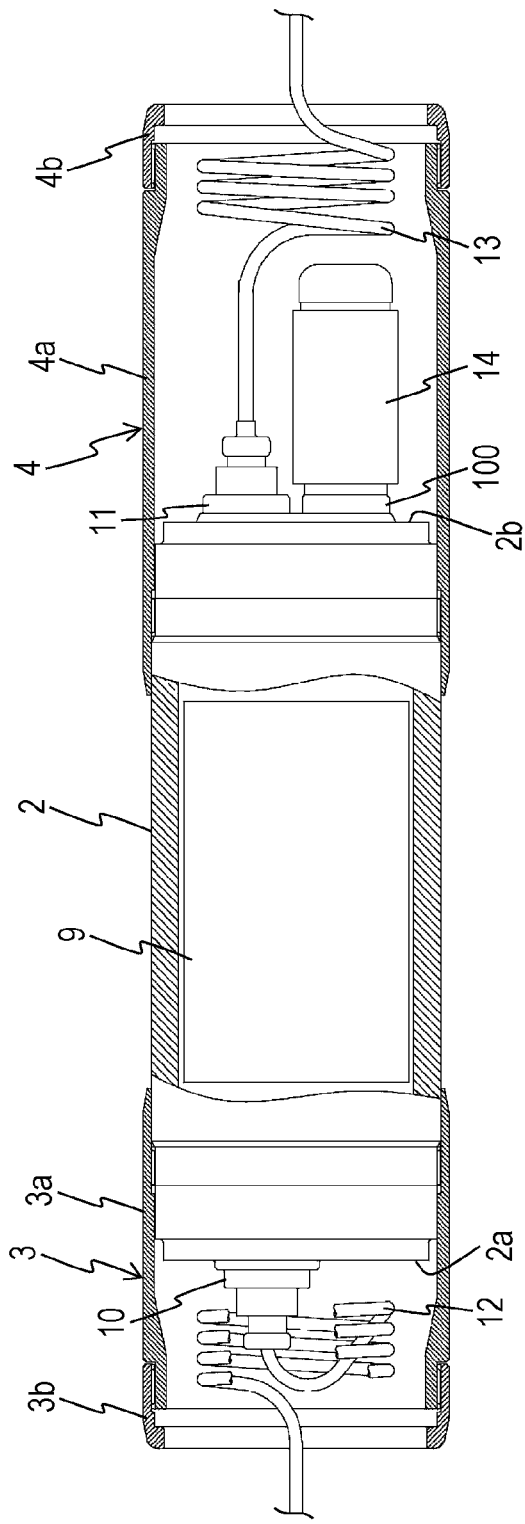
FIG. 3 is an enlarged view of a part III of FIG. 2.

FIG. 3 is an enlarged view of a part III of FIG. 2.

As illustrated in FIG. 1 and FIG. 2, the submarine repeater 1 includes a pressure-tight casing (one example of a casing) 2, couplers 3, 4, bellows 5, 6, and cable couplings 7, 8.

In addition, as illustrated in FIG. 3, the submarine repeater 1 further includes an internal unit 9, optical fiber feedthroughs 10, 11, tail cables 12, 13, and a measuring device 14 which is an example of measurement hardware.

As illustrated in FIG. 3, the pressure-tight casing 2 is internally kept water-tight and airtight by the optical fiber feedthrough 10 placed on an end face 2a on one end side, and the optical fiber feedthrough 11 and an electric wire feedthrough 100 placed on an end face 2b on other end side. With this structure, the interior of the pressure-tight casing 2 is made free from pressure of seawater. The pressure-tight casing 2 is shaped in a hollow cylinder, for example.

The couplers 3, 4 are provided on the sides of both ends (end faces 2a, 2b) of the pressure-tight casing 2. The couplers 3, 4 are shaped like a cylinder, for example. The couplers 3, 4 have joint rings 3a, 4a located on the side of the pressure-tight casing 2 and clamp rings 3b, 4b located on the side of the bellows 5, 6.

The joint rings 3a, 4a are screwed into outer circumference surfaces on the sides of both ends (end faces 2a, 2b) of the pressure-tight casing 2. A plurality of seawater introduction holes are formed on outer circumference surfaces of the joint rings 3a, 4a. The seawater introduction holes being formed, the interior of the couplers 3, 4 is filled with seawater. The clamp rings 3b, 4b are screwed into outer circumference surfaces of the ends of the joint rings 3a, 4a opposite to the side of the pressure-tight casing 2.

The bellows 5, 6 illustrated in FIG. 1 and FIG. 2 are positioned between the couplers 3, 4 and the cable couplings 7, 8. The cable couplings 7, 8 are coupled to the couplers 3, 4 by a universal joint so that an angle made by each other may vary. The bellows 5, 6 curve with the cable couplings 7, 8 inclining with respect to the couplers 3, 4.

Within the cable couplings 7, 8, the tail cables 12, 13 illustrated in FIG. 3 and a submarine cable 1001 illustrated in FIG. 1 and FIG. 2 are connected. The cable couplings 7, 8 have such a tapered shape that a diameter of the cable couplings 7, 8 becomes smaller as the cable couplings 7, 8 are away from the pressure-resistant casing 2. Although the submarine cable 1001 is arranged on the seabed, for example, the submarine cable 1001 may be floating in the sea. Similarly, the submarine repeater 1 may be floating in the sea, instead of being arranged on the seabed.

The tail cables 12, 13 and the submarine cable 1001 have a tubular power feeding conductor coated by an insulator such as polyethylene and the like, and optical fibers located inside the power feeding conductor.

The internal unit 9 is housed within the pressure-tight casing 2. The internal unit 9 also has an optical signal amplifier configured to amplify an optical signal transmitted through the submarine cable 1001. In addition, the internal unit 9 may have a circuit board (one example of a control unit) configured to control the measuring device 14, for example.

Directly or indirectly connected with the electric wire feedthrough 100, the measuring device 14 is indirectly connected with the submarine cable 1001 by way of the internal unit 9 and the optical fiber feedthrough 10. This electrically connects the measuring device 14 with the submarine cable 1001.

In addition, information acquired by the measuring device 14 is processed by a circuit (the above-mentioned circuit board, which is one example of the control unit, for example) housed in the pressure-tight casing 2.

The measuring device 14 measures one or more of the conditions in the sea (one example in water), such as water pressure, water temperature, acceleration (earthquake motion), salinity, electric conductance, underwater sound, cable electric generation voltage, anthropogenic carbon, and the like. Note that the conditions in the sea also include conditions of sea surface or conditions of the seabed.

If the measuring device 14 is a water temperature gauge, it is desirable that the measuring device 14 is located on the exterior of the coupler 4, being spaced a distance from any member other than the measuring device 14 of the submarine repeater 1, in order to avoid any influence of quantity of heat released from the submarine repeater 1.

In addition, a configuration of the submarine repeater 1 illustrated in FIG. 1 to FIG. 3 is one example of a configuration that the submarine repeater 1 includes the pressure-tight casing 2 and the feedthrough (electric wire feedthrough 100), and may be changed as appropriate.

Figure 4:
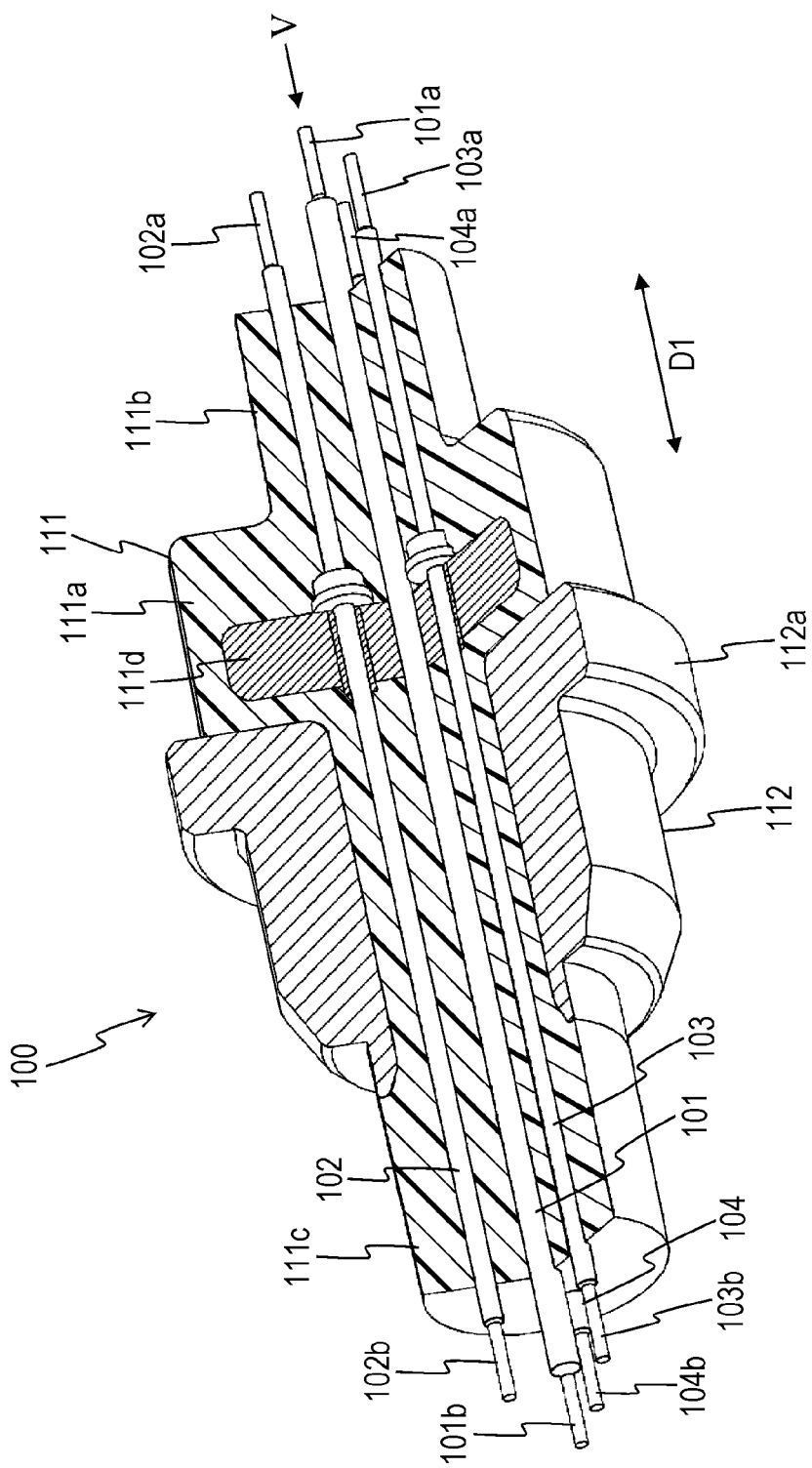
FIG. 4 is a partial sectional perspective view illustrating an electric wire feedthrough according to the first embodiment.

FIG. 4 is a partial sectional perspective view illustrating the electric wire feedthrough 100 according to the first embodiment.

Figure 5:
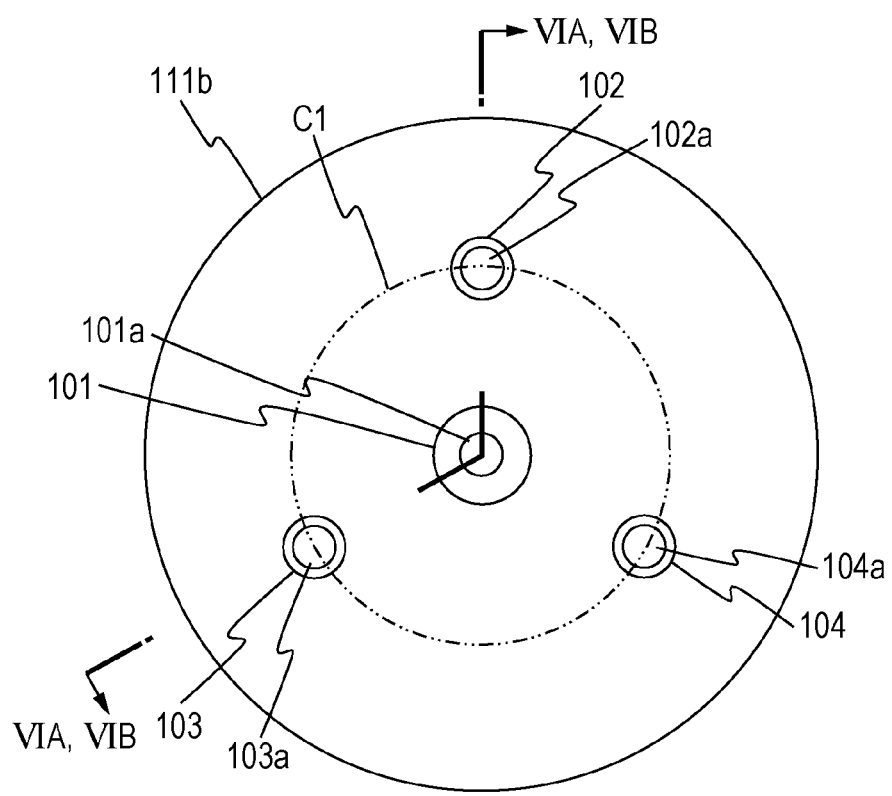
FIG. 5 is a view of one end side of the electric wire feedthrough when viewed from a direction V of FIG. 4.

FIG. 5 is a view of one end side of the electric wire feedthrough 100 when viewed from a direction V of FIG. 4.

Figure 6A:
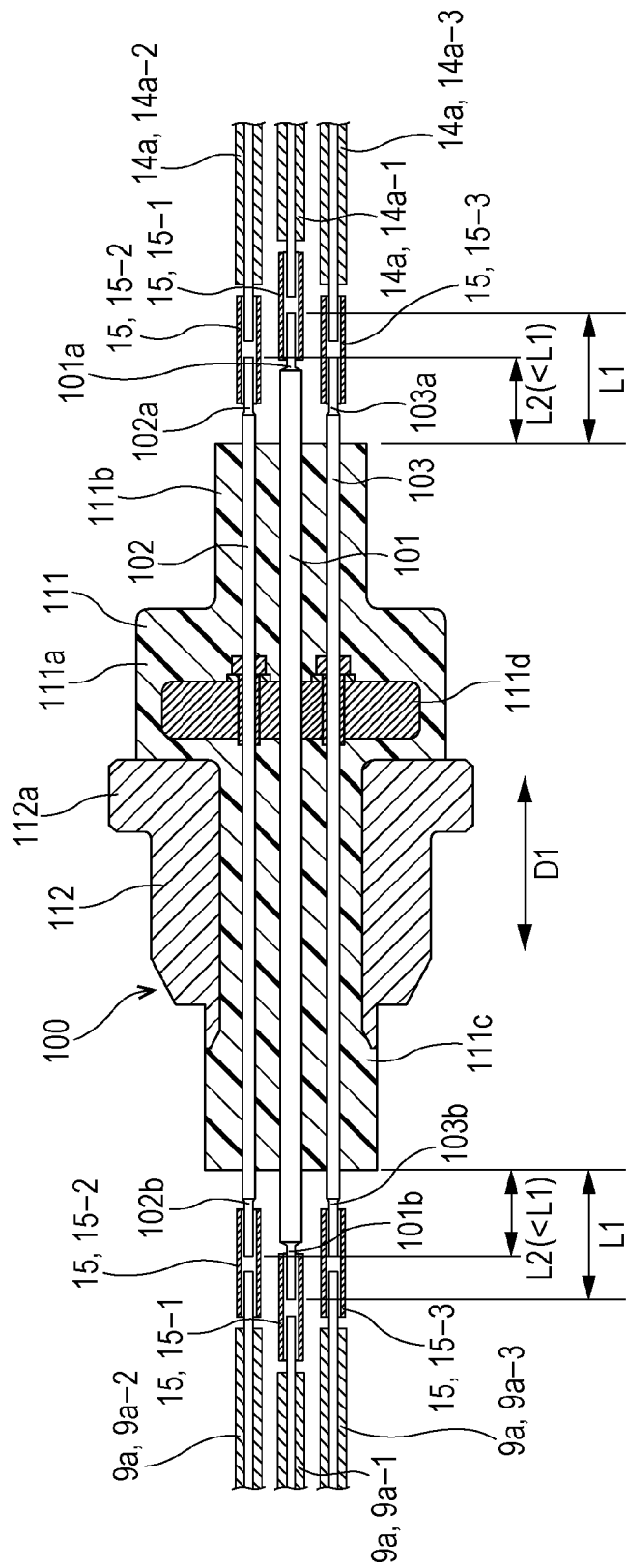
FIG. 6A is a VIA/VIB-VIA/VIB sectional view 1 (view illustrating how the electric wire cable is connected) of FIG. 5.

FIG. 6A and FIG. 6B are VIA/VIB-VIA/VIB cross sectional views (views illustrating how the electric wire cable is connected) of FIG. 5. Note that the cross sections in FIG. 6A and FIG. 6B are identical to the cross section of FIG. 4.

As illustrated in FIG. 4, the electric wire feedthrough 100 has a plurality of lead sections 101 to 104, a main body section 111, and a cap member 112.

The main body section 111 includes a flange section 111a, an outer projection section 111b, an inner projection section 111c, and a disk member 111d. The main body section 111 is positioned in a through-hole formed on the end faces 2a, 2b on the both sides of the pressure-tight casing 2 illustrated in FIG. 3, for example.

The outer projection section 111b projects from the flange section 111a to an outer side of the pressure-tight casing 2 (right side in FIG. 4, FIG. 6A, and FIG. 6B). In addition, the inner projection section 111c projects from the flange section 111a to an inner side of the pressure-tight casing 2 (left side in FIG. 4, FIG. 6A, and FIG. 6B).

Within the flange section 111a is provided the disk member 111d whose diameter is larger than an inside diameter of the cap member 112. The disk member 111d is subjected to pressure applied from the side of the outer projection section 111b to the side of the inner projection section 111c, in a direction (arrow direction D1) in which the plurality of lead sections 101 to 104 run through the main body section 111.

Materials of the flange section 111a, the outer projection section 111b, and the inner projection section 111c are an insulating material such as polyethylene, and the like, for example. In addition, a material of the disk member 111d is metal such as beryllium copper alloy and the like, for example.

The cap member 112 has a tubular shape and is provided on a part of the circumference on the side of the flange section 111a of the inner projection section 111c of the main body section 111. A material of the cap member 112 is metal such as beryllium copper alloy and the like, for example.

A flange section 112a of the cap member 112 is in contact with the flange section 111a of the main body section 111. A conical section (left side in FIG. 4) of the cap member 112 is pressed into the end face 2a, 2b (a conically shaped through-hole) of the pressure-tight casing 2 by moving the flange section 112a in a cone direction by a press machine. Thus, the conical section of the cap member 112 is fixed to the pressure-tight casing 2, and seals the interior of the pressure-tight casing 2. This keeps the interior of the pressure-tight casing 2 water-tight and airtight.

Note that the configuration of the electric wire feedthrough 100 illustrated in FIG. 4 to FIG. 6B is an example of a configuration that the electric wire feedthrough 100 includes the main body section 111 and the plurality of lead sections 101 to 104, and may be changed as appropriate.

In the first embodiment, the plurality of lead sections 101 to 104 may be sorted to one central lead section 101 and three (one example of multiple leads) outer circumferential lead sections 102, 103, 104. The central lead section 101 and the outer circumferential lead sections 102, 103, 104 run through the main body section 111, extending to both sides of the inner side and the outer side of the pressure-tight casing 2.

As illustrated in FIG. 4, for the central lead section 101 and the outer circumferential lead sections 102, 103, 104, small-diameter parts 101a, 102a, 103a, 104a are formed on ends on the outer side (right side in FIG. 4) of the pressure-tight casing 2. In addition, also for the central lead section 101 and the outer circumferential lead sections 102, 103, 104, small-diameter parts 101b, 102b, 103b, 104b are also formed on ends of the inner side (left side in FIG. 4) of the pressure-tight casing 2. Note that while the central lead section 101 is fixed to the disk member 111d in contact with the disk member 111d, an insulator is intermediate between the outer circumferential lead sections 102, 103, 104 and the disk member 111d.

As illustrated in FIG. 5, the central lead section 101 is located at the center of the main body section 111. Note that the center as mentioned herein refers to the center of the main body section 111 in a plane (distal surface of the outer projection section 111b illustrated in FIG. 5, for example) orthogonal to the through direction (arrow direction D1) illustrated in FIG. 4. The central lead section 101 has a larger diameter than the outer circumferential lead sections 102, 103, 104, for example. With this, when an insulator part of the flange section 111a, the outer projection section 111b, and the inner projection section 111c of the main body section 111 illustrated in FIG. 4 is formed of a resin mold such as polyethylene and the like, the main body section 111 may be supported by using the central lead section 101 as a center axis against injection pressure of polyethylene and the like.

As illustrated in FIG. 5, the outer circumferential lead sections 102, 103, 104 are located on the outer circumference side of the main body section 111 than the central lead section 101. In addition, the outer circumference side lead sections 102, 103, 104 are located on a concentric circle (C1) whose center is set at the center of the main body section 111 (the central lead section 101 in the first embodiment), for example. In addition, the central lead section 101 may be located out of the center of the main body section 111, and may be located on the center side of the outer circumferential lead sections 102, 103, 104 in the main body section 111. In addition, a plurality of central lead sections 101 may be placed. For example, the plurality of central lead sections 101 may be located on a concentric circle whose center is set at the center of the main body section 111.

Although it is simply an example, the central lead section 101 is a ground wire, one outer circumferential lead section 102 is a power wire, and other outer circumferential lead sections 103, 104 are signal wires. Note that an optical fiber may be inserted into a hollow part with the central lead section 101 and the outer circumferential lead sections 102, 103, 104 as a tube.

As illustrated in FIG. 6A, extension length L2 that the outer circumferential lead sections 102, 103, 104 extend from the main body section 111 is shorter than extension length L1 that the central lead section 101 extends from the main body section 111 (L2<L1). As such, the length of the central lead section 101 and the length of the outer circumferential lead sections 102, 103, 104 are different from each other.

For example, a difference in length between L2 and L1 only has to be equal to or larger than thickness of a tool to be used. Note that in FIG. 6A and FIG. 6B, the outer circumferential lead section 104 is not depicted. In addition, even if the base portions of the lead sections 101 to 104 are located at different positions because the main body section 111 has an irregular end face (face illustrated in FIG. 5, for example) on the base side of the lead sections 101 to 104, the extension lengths L1, L2 may be considered as length from a plane orthogonal to the through direction (arrow D1) of the lead sections 101 to 104. Thus, the length of the extension length L1, L2 of the lead sections 101 to 104 may be determined by positions of the tips of the lead sections 101 to 104.

The same relationship between the extension lengths as described above may be applied to both the inner side (left side in FIG. 6A) and the outer side (right side in FIG. 6A) of the pressure-tight casing 2. In addition, although the extension lengths may be made different in only one of the inner side and the outer side of the pressure-tight casing 2 as described above, it is desirable to make the extension lengths different in both the inner side and the outer side of the pressure-tight casing 2, from the standpoint of facilitating cable connection as described below.

While the extension length L2 of the outer circumferential lead sections 102, 103, 104 is mutually identical, the extension length L2 may be different from each other. As such, the extension lengths of the plurality of lead sections 101 to 104 may be three or more lengths, in place of two lengths.

Ends (small-diameter part 101a, 102a, 103a, 104a) of the central lead section 101 and the outer circumferential lead sections 102, 103, 104 are connected to measuring device-side electric wire cables 14a (14a-1, 14a-2, 14a-3) of the measuring device 14. In addition, other ends (small-diameter parts 101b, 102b, 103b, 104b) of the central lead section 101 and the outer circumferential lead sections 102, 103, 104 are connected to internal unit-side electric wire cables 9a (9a-1, 9a-2, 9a-3) of the internal unit 9. Note that the outer circumferential lead section 104, as well as the measuring device-side electric wire cables 14a and the internal unit-side electric wire cables 9a connected to the outer circumferential lead section 104 are not illustrated in FIG. 6A and FIG. 6B.

Here, with reference to FIG. 6A and FIG. 6B, connection of the central lead section 101 and the outer circumferential lead sections 102, 103, 104 with the internal unit-side electric wire cables 9a and the measuring device-side electric wire cables 14a is described. Here, since connection with the measuring device-side electric wire cables 14a is similar to connection with the internal unit-side electric wire cables 9a, a description is given with the connection with the internal unit-side electric wire cables 9a as an example.

First, as illustrated in FIG. 6A, the central lead section (one example of a first lead section) 101 is connected to the internal unit-side electric wire cable (one example of a first cable) 9a-1. The connection is performed by a crimping connection section 15-1 which uses a crimping tool. However, the connection may be performed by other connection vehicle such as high frequency brazing, resistance brazing, and the like.

Then, the outer circumferential lead sections (one example of a second lead section) 102, 103, 104 are sequentially connected to the internal unit-side electric wire cables (one example of a second cable) 9a-2, 9a-3 by crimping connection sections 15-2, 15-3, for example. Note that as described above, the outer circumferential lead section 104, as well as the internal unit-side electric wire cables 9a and the measuring device-side electric wire cable 14a, which are connection destinations of the outer circumferential lead section 104, although not illustrated in FIG. 6A and FIG. 6B, are similarly connected to the remaining two outer circumferential lead sections 102, 103.

After the central lead section 101 and the outer-side lead sections 102, 103, 104 are connected to the internal unit-side electric wire cables 9a and the measuring device-side electric wire cables 14a, surrounding areas of the crimping connection sections 15 are covered by a mold connection section 16, as illustrated in FIG. 6B. The mold connection section 16 is formed of an insulating material such as polyethylene.

Then, the tail cables 12, 13 are connected to the optical fiber feedthroughs 10, 11 illustrated in FIG. 3. In addition, the pressure-tight casing 2 is sealed with the electric wire feedthrough 100 or the optical fiber feedthroughs 10, 11 placed. In addition, connection of the tail cables 12, 13 with the submarine cable 1001 or arrangement of the bellows 5, 6 and the cable couplings 7, 8 are performed. Thus, the submarine repeater 1 illustrated in FIG. 1 and FIG. 2 is manufactured.

In addition, the electric wire feedthrough 100 and the optical fiber feedthrough 11 may be formed as a single feedthrough in which the lead section of the optical fiber feedthrough 11 and lead sections 101 to 104 of the electric wire feedthrough 100 may be provided. This may simplify the structure. On the other hand, if the electric wire feedthrough 100 and the optical fiber feedthrough 11 are separately provided, work to replace a feedthrough or a connection device in the submarine repeater 1, and other work may be made easier.

In addition, the electric wire feedthroughs 100 may be placed on both the one end face 2b and the other end face 2a of the pressure-tight casing 2. Alternatively, the electric wire feedthrough 100 may be placed only on the other end face 2a of the pressure-tight casing 2. Also if the electric wire feedthrough 100 is placed on the other end face 2a, the electric wire feedthrough 100 is connected to a device such as the measuring device 14, and the like.

FIG. 7 is a sectional view illustrating a measuring device 17 and the like in a variation of the first embodiment.

A configuration illustrated in FIG. 7 is a variation in which the measuring device 14 in the configuration illustrated in FIG. 3 is changed to other measuring device 17.

The measuring device 17 has a measuring device main body 17a and an oil-filled electric cable 17b. The measuring device main body 17a is a manometer containing oil, for example. The oil-filled electric cable 17b has an electric wire whose surrounding area is filled with insulating oil which is different from the oil in the measuring device main body 17a.

A position to place the measuring device main body 17a may be adjusted, depending on how to route the oil-filled electric cable 17b of the measuring device 17. In the example of FIG. 7, the measuring device main body 17a is located in the periphery of the electric wire feedthrough 100 and close to the pressure-tight casing 2. Note that the measuring device main body 17a may be arranged in the sea outside the coupler 4 by way of a cable such as the oil-filled electric cable 17b.

Figure 8:
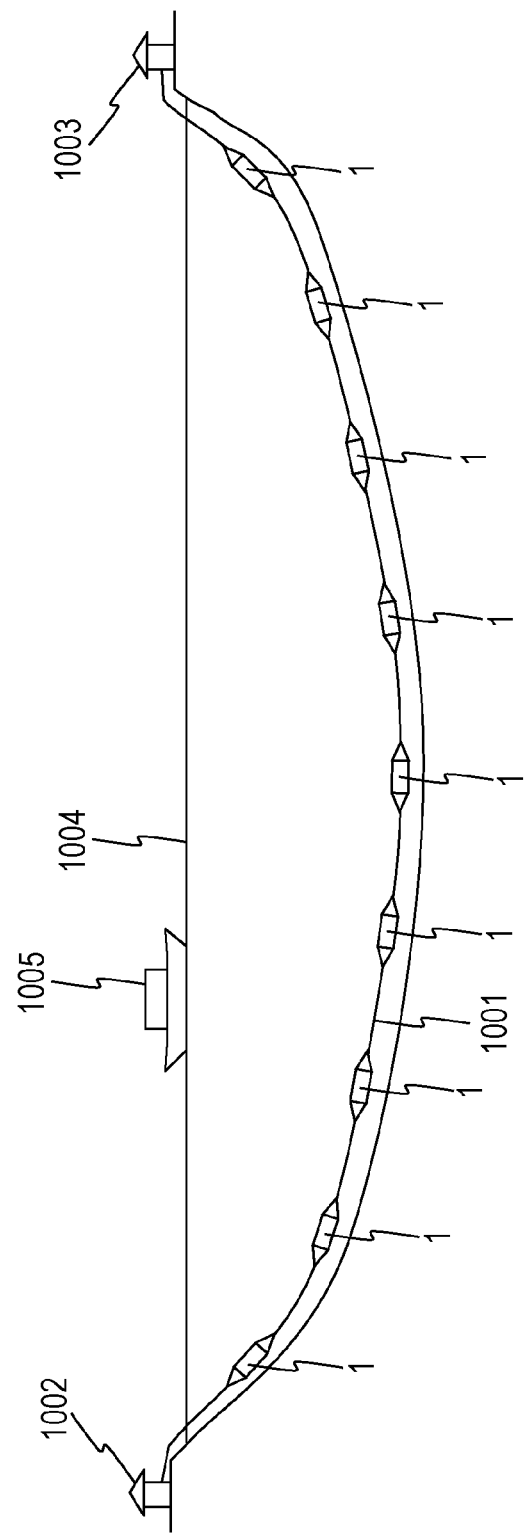
FIG. 8 is a view (1) illustrating an arrangement example of the submarine repeater according to the first embodiment.
Figure 9:
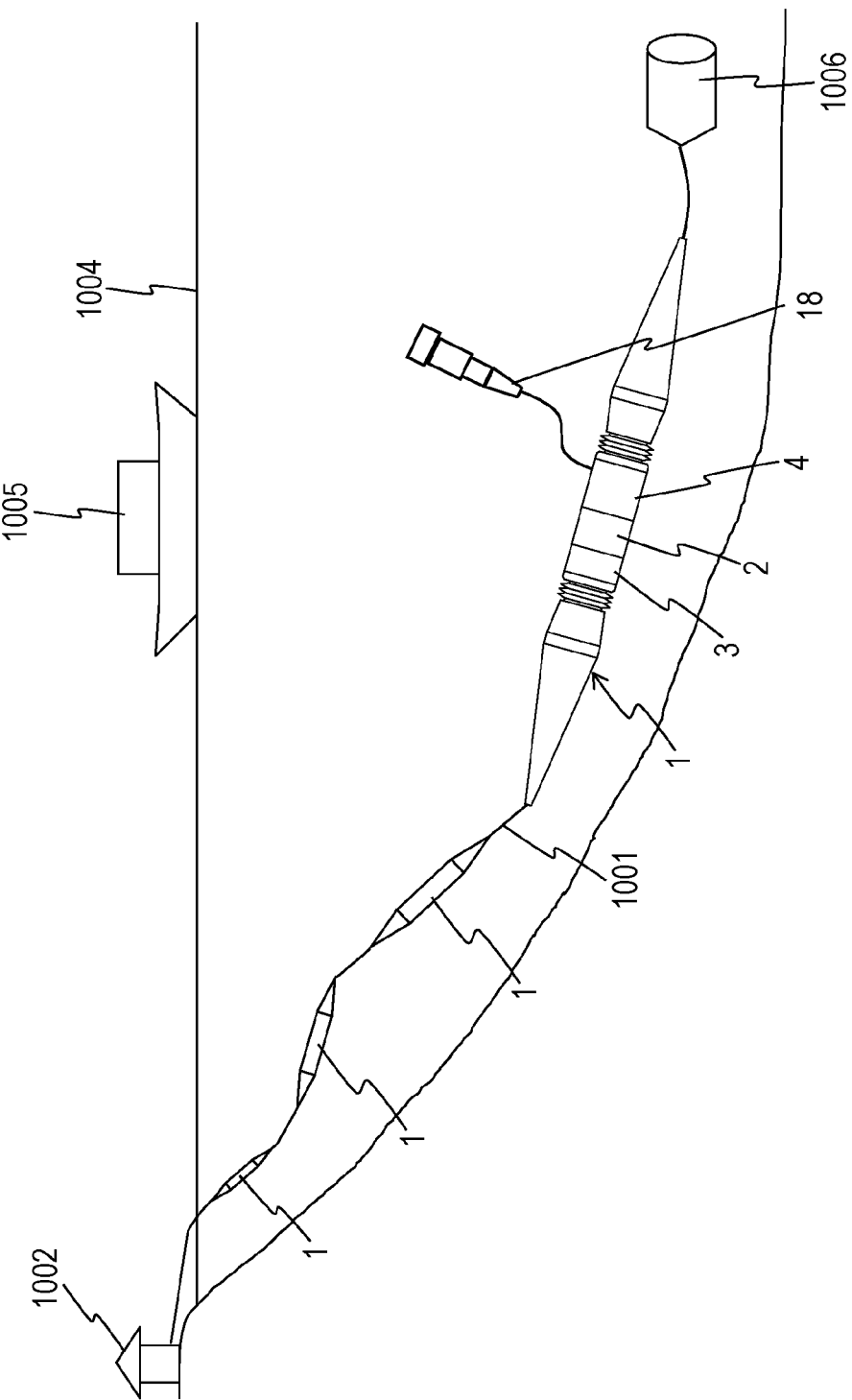
FIG. 9 is a view (2) illustrating an arrangement example of the submarine repeater according to the first embodiment.

FIG. 8 and FIG. 9 are views illustrating an arrangement example of the submarine repeater 1 according to the first embodiment.

As illustrated in FIG. 8, the submarine cable 1001 is laid in the sea and located across a first landing station 1002 and a second landing station 1003. A plurality of the submarine repeaters 1 are arranged on the submarine cable 1001. Note that a ship 1005 is floating on the sea surface 1004.

As illustrated in FIG. 9, instead of the second landing station 1003, an earth electrode 1006 configured to cause electric currents to flow into or from the sea may be located on the opposite side to the first landing station 1002. The arrangement example illustrated in this figure is not used for communications between the landing stations 1002, 1003 and thus is an arrangement example for other purpose, such as intended use to arrange the measuring device 14 illustrated in FIG. 3 or the measuring device 17 illustrated in FIG. 7, for example. Note that one example of a device to be placed in the submarine repeater 1 other than the measuring devices 14, 17 is an underwater mateable connector 18. The underwater mateable connector 18 is used for power feeding to or communications with a device arranged in the sea. One example of other devices is an echo sounder, an imaging device, an underwater sound modem, and the like.

In the first embodiment described above, the electric wire feedthrough 100 has the plurality of lead sections 101 to 104 connecting a circuit (internal unit-side electric wire cables 9a) housed in the pressure-tight casing 2 with the cables (measuring device-side electric wire cables 14a) outside the pressure-tight casing 2. In addition, at least two lead sections of the plurality of lead sections 101 to 104 have length which is different to each other (L2<L1).

Thus, a space to use a tool which forms connection sections such as the crimping connection sections 15 or a brazing connection sections is secured only by making the connection positions of the internal unit-side electric wire cables 9a or the measuring device-side electric wire cables 14a with the plurality of lead sections 101 to 104 different from each other by an amount equal to or more than the thickness of the tool to be used, for example.

Hence, according to the first embodiment, the work to connect the internal unit-side electric wire cables 9a and the measuring device-side electric wire cables 14a with the plurality of lead sections 101 to 104 of the electric wire feedthrough 100 is facilitated.

In the first embodiment, the plurality of lead sections 101 to 104 include the central lead section 101 and the plurality of outer circumferential lead sections 102, 103, 104 which are located on the outer circumference side of the central lead section 101 and have shorter extension length than the central lead section 101 (L2<L1). Thus, the connection work is facilitated by performing connection of the internal unit-side electric wire cables 9a and the measuring device-side electric wire cables 14a on the central lead section 101 before the connection on the outer circumferential lead sections 102, 103, 104.

In addition, in the first embodiment, the plurality of outer circumferential lead sections 102, 103, 104 are located on the concentric circle (C1) whose center is set at the center of the main body section 111. Thus, the connection work of the outer circumferential lead sections 102, 103, 104 with the internal unit-side electric wire cable 9a and the measuring device-side electric wire cables 14a is facilitated.

In addition, in the first embodiment, the central lead section 101 is located at the center of the main body section 111. Thus, when insulated parts such as the flange section 111a, the outer projection section 111b, and the inner projection section 111c of the main body section 111 are formed by molding, the central lead section 101 may be supported as a central axis.

In addition, in the first embodiment, the measuring devices 14, 17, which are one example of measurement hardware, are connected to one end of the measuring device-side electric wire cables 14a to measure the conditions in water, for example. Thus, work to connect to the lead sections 101 to 104 the plurality of measuring device-side electric wire cables 14a such as the power wire, the ground wire, a control wire and the like to be used in response to placement of the measuring devices 14, 17 is facilitated.

In addition, in the first embodiment, one example of a feedthrough is the electric wire feedthrough 100 having the plurality of lead sections 101 to 104 connected to the electric wire cables (internal unit-side electric wire cables 9a and the measuring device-side electric wire cables 14a). Thus, the connection work to connect the electric wire cables such as the power wire, the ground wire, the control wire and the like to the plurality of lead sections 101 to 104 is facilitated.

In addition, in the first embodiment, one of the internal unit-side electric wire cable (one example of the first cable) 9a-1 or the measuring device-side electric wire cable (one example of the first cable) 14a-1 is connected to the central lead section (one example of the first lead section) 101. Then, the internal unit-side electric wire cables (one example of the second cable) 9a-2, 9a-3 or the measuring device-side electric wire cables (one example of the second cable) 14a-2, 14a-3 are connected to the outer circumferential lead sections (one example of the second lead section) 102, 103 (104). Thus, performing the connection with the internal unit-side electric wire cable 9a and the measuring device-side electric wire cable 14a earlier on the central lead section 101 whose extension length is longer than the outer circumferential lead sections 102, 103, 104 facilitates the connection work.

Figure 10:
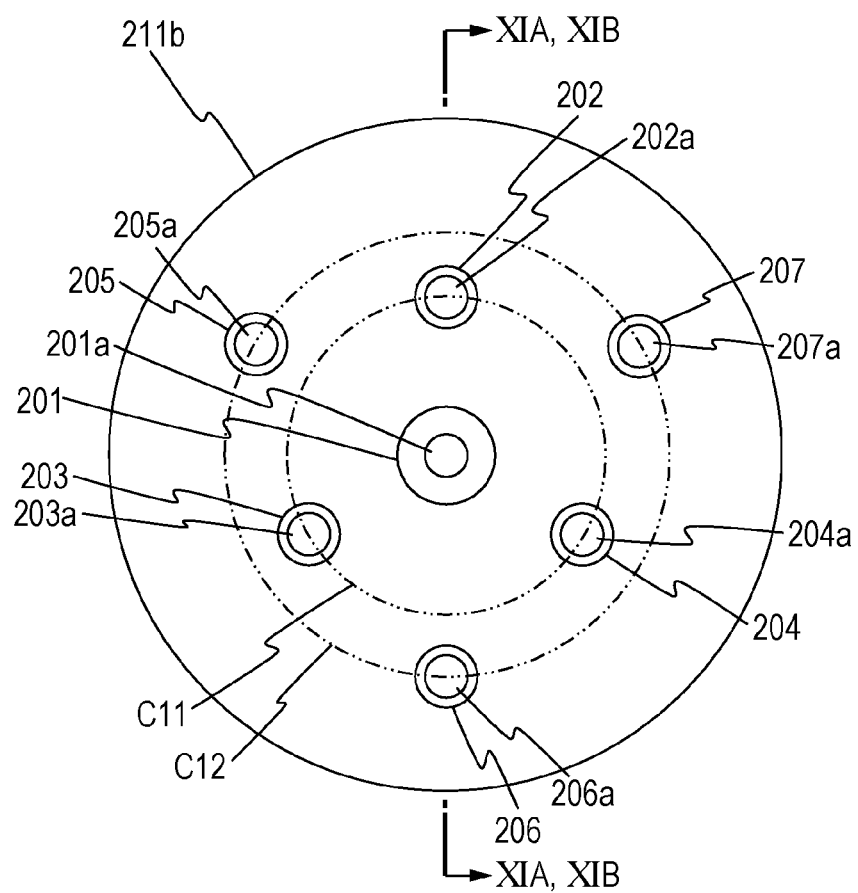
FIG. 10 is a view illustrating a lead section (7-core) in a second embodiment.

FIG. 10 is a view illustrating 7-core lead sections 201 to 207 in a second embodiment. Note that FIG. 10 is a drawing corresponding to FIG. 5 in the first embodiment.

Figure 11A:
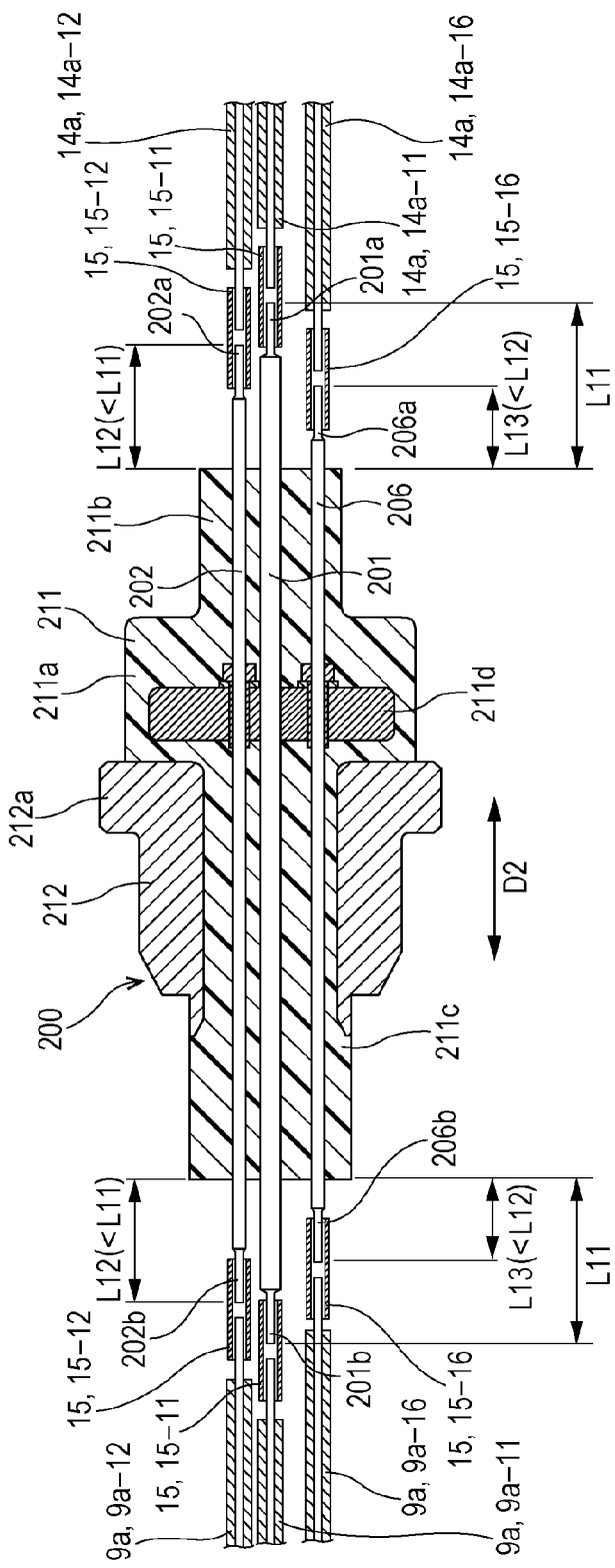
FIG. 11A is a XIA/XIB-XIA/XIB sectional view 1 (view illustrating how an electric wire cable is connected) of FIG. 10.
Figure 11B:
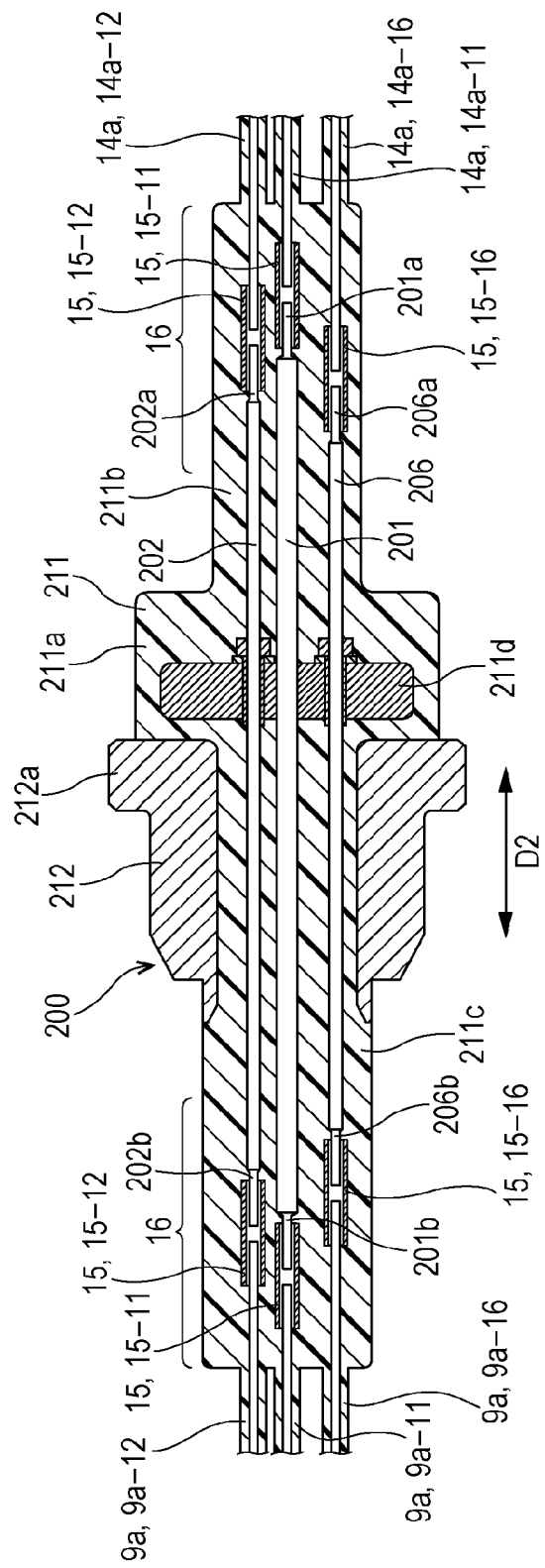
FIG. 11B is a XIA/XIB-XIA/XIB sectional view 2 (view illustrating how the electric wire cable is connected) of FIG. 10.

FIG. 11A and FIG. 11B are XIA/XIB-XIA/XIB cross sectional views (views illustrating how an electric cable is connected) of FIG. 10.

In the second embodiment, although the number of the lead sections 201 to 207 differs from the number (4 leads) of the first embodiment, other configuration is similar. Thus, any overlapping description is omitted as appropriate.

An electric wire feedthrough 200 illustrated in FIG. 11A and FIG. 11B has a plurality of the lead sections 201 to 207 (see FIG. 10), a main body section 211, and a cap member 212.

Similar to the main body section 111 of the first embodiment, the main body section 211 includes a flange section 211a, an outer projection section 211b, an inner projection section 211c, and a disk member 211d.

The cap member 212 also has a flange section 212a, similar to the cap member 112 of the first embodiment.

As illustrated in FIG. 10, the plurality of lead sections 201 to 207 may be sorted to one central lead section 201, three (one example of multiple leads) intermediate lead sections 202, 203, 204, and three (one example of multiple leads) outer circumferential lead sections 205, 206, 207. The plurality of lead sections 201 to 207 run through the main body section 211, extending to the inner side and the outer side of the pressure-tight casing 2 illustrated in FIG. 3. Note that the intermediate lead sections 202, 203, 204 may be one.

As illustrated in FIG. 10 to FIG. 11B, for the plurality of lead sections 201 to 207, small-diameter parts 201a to 207a are formed on ends on the outer side (right side in FIG. 11A) of the pressure-tight casing 2. In addition, also for the plurality of lead sections 201 to 207, small-diameter parts 201b, 202b, 206b (only partially illustrated) are formed on ends on the inner side (left side in FIG. 11A) of the pressure-tight casing 2. Note that while the central lead section 201 is fixed to the disk member 211d in contact with the disk member 211d, an insulator is intermediate between other lead sections 202 to 207 and the disk member 211d.

As illustrated in FIG. 10, the central lead section 201 is located at the center of the main body section 211. Similar to the first embodiment, the center of the main body section 211 is the center of the main body section 211 in a plane (distal surface of the outer projection section 211b illustrated in FIG. 10, for example) orthogonal to the through direction (arrow D2) illustrated in FIG. 11A and FIG. 11B.

The outer circumferential lead sections 205, 206, 207 are located on the outer circumference side of the central lead section 201 in of the main body section 211. In addition, the outer circumferential lead sections 205, 206, 207 are located on a concentric circle (C12) whose center is set at the center of the main body section 211 (the central lead section 201 also in the second embodiment). In addition, the outer circumferential lead sections 205, 206, 207 are arranged at regular intervals on the concentric circle (C12).

The intermediate lead sections 202, 203, 204 are located on the outer circumference side of the central lead section 201 and on the center side of the outer circumferential lead sections 205, 206, 207. In addition, the intermediate lead sections 202, 203, 204 are located a concentric circle (C11) whose center is set at the center of the main body section 211 (central lead section 201), for example. In addition, the intermediate lead sections 202, 203, 204 are arranged at regular intervals on the concentric circle (C11). Note that the intermediate lead sections 202, 203, 204 are located in the middle, in a circumferential direction of the concentric circle (C11), between a plurality of positions of the concentric circle (C11) located closest to the outer circumferential lead sections 205, 206, 207.

Although it is simply an example, each lead section 201 to 207 is respectively more than one ground wire, power wire, and signal wire.

As illustrated in FIG. 11A, the intermediate lead sections 202, 203, 204 have shorter extension length than the central lead section 201 (L12<L11) and longer extension length than the outer circumferential lead sections 205, 206, 207

(L12>L13). A difference in length between L13 and L12 and a difference in length between L12 and L11 only have to be equal to or larger than the thickness of a tool to be used, for example.

Note that a relationship of the extension lengths as described above is true in both the inner side and the outer side of the pressure-tight casing 2 illustrated in FIG. 3. In addition, while the extension lengths L12 of the intermediate lead sections 202, 203, 204 are mutually identical, the extension lengths L12 may be different from each other. While the extension lengths L13 of the outer circumferential lead sections 205, 206, 207 are also mutually identical, the extension lengths L13 may be different from each other. As such, while the extension lengths of the plurality of lead sections 201 to 207 are three lengths of L11, L12, and L13, the extension lengths may be four or more lengths.

Ends of the plurality of lead sections 201 to 207 (small-diameter parts 201a to 207a) are connected to the measuring device-side electric wire cables 14a (14a-11, 14a-12, 14a-16 and the like) of the measuring device 14 illustrated in FIG. 3. In addition, other ends of the plurality of lead sections 201 to 207 (small-diameter parts 201b, 202b, 206b and the like) are connected to the internal unit-side electric wire cables 9a (9a-11, 9a-12, 9a-16 and the like) of the internal unit 9 illustrated in FIG. 3.

Here, with reference to FIG. 11A and FIG. 11B, connection of the plurality of lead sections 201 to 207 with the internal unit-side electric wire cables 9a or the measuring device-side electric wire cables 14a is described. Since the connection with the measuring device-side electric wire cables 14a is similar to the connection with the internal unit-side electric wire cables 91, a description is given with the internal unit-side electric wire cables 9a as an example.

First, the central lead section 201 is connected to the internal unit-side electric wire cable 9a-11. The connection is performed by a calling connection unit 15 (15-11) which uses a crimping tool. However, the connection may be performed by other connection vehicle such as high frequency brazing, resistance brazing, and the like.

Then, the intermediate lead sections 202, 203, 204 are sequentially connected to the internal unit-side electric cable wire 9a (9a-12 and the like) by the crimping connection section 15 (15-12 and the like), for example. Note that the intermediate lead sections 203, 204 as well as the internal unit-side electric wire cable 9a and the measuring device-side electric wire cable 14a which are connection destinations of the intermediate lead sections 203, 204 are not illustrated in FIG. 11A and FIG. 11B.

Then, the outer circumferential lead sections 205, 206, 207 are sequentially connected to the internal unit-side electric wire cable 9a (9a-16 and the like) by the crimping connection section 15 (15-16 and the like). Note that the outer circumferential lead sections 205, 207 as well as the internal unit-side electric wire cable 9a and the measuring device-side electric wire cable 14a which are connection destinations of the outer circumferential lead sections 205, 207 are not illustrated in FIG. 11A and FIG. 11B.

After the plurality of lead sections 201 to 207 are connected to the internal unit-side electric wire cable 9a and the measuring device-side electric wire cable 14a, surrounding areas of the crimping connection sections 15 are covered by a mold connection section 16, as illustrated in FIG. 11B. The mold connection section 16 is formed of an insulating material such as polyethylene. Other processes of the manufacturing method of the submarine repeater 1 may be similarly performed to the first embodiment.

In the second embodiment described above, similar effects may be achieved for matters similar to the first embodiment. More particularly, according to the second embodiment, the effect of facilitating the work to connect the internal unit-side electric wire cable 9a and the measuring device-side electric wire cable 14a to the plurality of lead sections 201 to 207 of the electric wire feedthrough 200, and the like may be achieved.

In addition, in the second embodiment, the plurality of intermediate lead sections 202, 203, 204 are located on the outer circumference side of the central lead section 201 and on the center side of the outer circumferential lead sections 205, 206, 207. In addition, the plurality of intermediate lead sections 202, 203, 204 are located on the concentric circle C11. Furthermore, the plurality of intermediate lead sections 202, 203, 204 are shorter in length than the central lead section 201 (L12<L11), and longer in length than the outer circumferential lead sections 205, 206, 207 (L12>L13). Thus, performing the connection of the internal unit-side electric wire cable 9a and the measuring device-side electric wire 14a in the order of the central lead section 201, the intermediate lead sections 202, 203, 204, and the outer circumferential lead sections 205, 206, 207 facilitates the connection work.

FIG. 12 is a view illustrating 9-core lead sections 301 to 309 in a third embodiment. Note that FIG. 12 is a drawing corresponding to FIG. 5 (the first embodiment) and FIG. 10 (the second embodiment). In addition, the XIA/XIB-XIA/XIB cross sectional view of FIG. 12 is a view of an identical structure to FIG. 11A and FIG. 11B of the second embodiment, a description is given with reference to FIG. 11A and FIG. 11B, as appropriate.

While the third embodiment differs from the second embodiment in that the number of intermediate lead sections 302 to 305 and outer circumferential lead sections 306 to 309 is increased by one each from the number in the second embodiment (three leads each), the third embodiment is same as the second embodiment in other configurations. Thus, an overlapping description is omitted, as appropriate.

As illustrated in FIG. 12, a plurality of the lead sections 301 to 309 may be sorted to one central lead section 301, four (one example of multiple leads) intermediate lead sections 302 to 305, and four (one example of multiple leads) outer circumferential lead sections 306 to 309. The plurality of the lead sections 301 to 309 run through a main body section (similar to the main body section 211 illustrated in FIG. 11A and FIG. 11B) having an outer projection section 311b, extending to the inner side and the outer side of the pressure-tight casing 2 illustrated in FIG. 3.

For the plurality of the lead sections 301 to 309, small-diameter sections 301a to 309a illustrated in FIG. 12 are formed on ends on the outer side of the pressure-tight casing 2. In addition, also for the plurality of lead sections 301 to 309, small-diameter parts are formed on ends on the inner side of the pressure-tight casing 2.

As illustrated in FIG. 12, the central lead section 301 is located at the center of the main body section. The intermediate lead sections 302 to 305 are located on a concentric circle (C21) whose center is set at the center of the main body section (central lead section 301), for example. The outer circumferential lead sections 306 to 309 are also located on a concentric circle (C22) whose center is set at the center of the main body section (central lead section 301), for example. Note that the intermediate lead sections 302 to 305 are located in the middle, in a circumferential direction of the concentric circle (C21), between a plurality of positions on the concentric circle (C21) located closest to the outer circumferential lead sections 306 to 309.

Although it is simply an example, also in the third embodiment, each lead section 301 to 309 is respectively one or more ground wire, power wire, and signal wire.

The intermediate lead sections 302 to 305 illustrated in FIG. 12 have shorter extension length than the central lead section 301 (L22<L21) and longer extension length than the outer circumferential lead sections 306 to 309 (L22>L23). A difference in length between L23 and L22 and a difference in length between L22 and L21 have only to exceed thickness of a tool to be used, for example.

Note that a relationship of the extension lengths as described above is true in both the inner side and the outer side of the pressure-tight casing 2 illustrated in FIG. 3. Also in the third embodiment, while the extension lengths L22 of the intermediate sections 302 to 305 are mutually identical, the extension lengths L22 may be different from each other. While the extension lengths L23 of the outer circumferential lead sections 306 to 309 are mutually identical, the extension lengths L23 may be different from each other. As such, while the extension lengths of the plurality of lead sections 301 to 309 are three lengths of L21, L22, and L23, the extension lengths may be four or more lengths.

Since a manufacturing method of the submarine repeater 1 such as connection of the plurality of lead sections 301 to 309 with cables is similar to the manufacturing method described in the second embodiment with reference to FIG. 11A and FIG. 11B, a description is omitted.

In the third embodiment described above, similar effects may be achieved for matters similar to the first embodiment and the second embodiment. More particularly, according to the third embodiment, the effect of facilitating the work to connect cables to the plurality of lead sections 301 to 309 of the electric wire feedthroughs 300, and the like may be achieved.

FIG. 13 is a front view illustrating a submarine branching unit 401 according to a fourth embodiment.

FIG. 14 is a partial cross sectional front view illustrating the submarine branching unit 401 according to the fourth embodiment.

As illustrated in FIG. 13, the submarine branching unit 401 includes a pressure-tight casing (one example of a casing) 402, couplers 403, 404, bellows 405, 406 (406-1, 406-2), and cable couplings 407, 408 (408-1, 408-2).

In addition, as illustrated in FIG. 14, the submarine branching unit 401 further includes optical fiber feedthroughs 410, 411 and tail cables 412 (412-1, 412-2), 413 (413-1, 413-2).

Note that in the fourth embodiment, one example of a "repeater" is the submarine branching unit 401 and one example of a "feedthrough" is the feedthroughs 410, 411.

The pressure-tight casing 402 is internally kept watertight and airtight by the optical fiber feedthrough 410 placed on an end face 402a on the side of one end and a feedthrough for optical wire 411 placed on an end face 402b on the side of the other end. The pressure-tight casing 402 is shaped like a hollow cylinder, for example.

The couplers 403, 404 are provided on the sides of both ends (end faces 402a, 402b) of the pressure-tight casing 402. The coupler 403 on the side of the end face 402a at the one end of the pressure-tight casing 402 is shaped like a cylinder, for example. In addition, the coupler 404 on the side of the end face 402b at the other end of the pressure-tight casing 402 shaped like a cylinder branching from the pressure-tight casing 402 to two branches across the two bellows 406-1, 406-2.

The bellows 405, 406-1, 406-2 are positioned between the couplers 403, 404 and the cable couplings 407, 408-1, 408-2. The cable couplings 407, 408-1, 408-2 are coupled to the couplers 403, 404 by universal joints so that angles made therebetween may vary. The bellows 405, 406-1, 406-2 curve with the cable couplings 407, 408-1, 408-2 inclining with respect to the couplers 403, 404.

The tail cables 412-1, 412-2, 413-1, 413-2 are connected with submarine cables 1001, 1001-1, 1001-2 within the cable couplings 407, 408. The cable couplings 407, 408-1, 408-2 have such a tapered shape that a diameter becomes smaller as the cable couplings are away from the pressure-tight casing 402.

Note that the tail cables 412-1, 412-2, 413-1, 413-2 and the submarine cables 101, 1001-1, 1001-2 have an optical fiber located within a tubular power feeding conductor coated by an insulating material such as polyethylene and the like.

Figure 15:
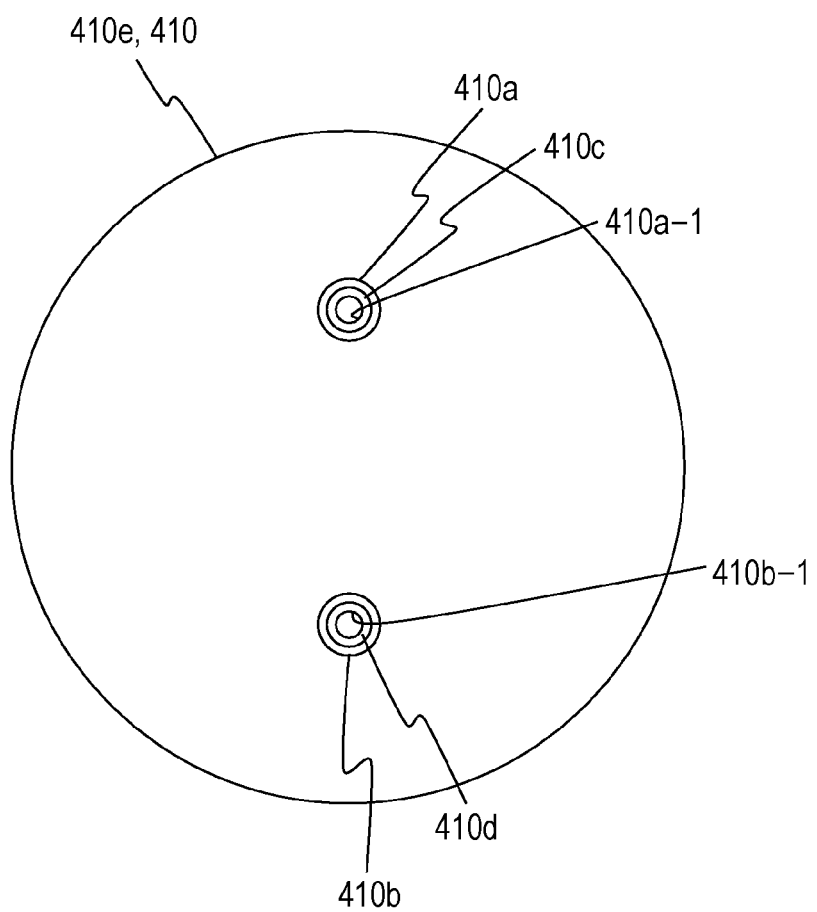
FIG. 15 is a view illustrating a lead section (2-core) in the fourth embodiment.

FIG. 15 is a view illustrating 2-core lead sections 410a, 410b in the fourth embodiment. Note that FIG. 15 is a drawing corresponding to FIG. 5 (the first embodiment), FIG. 10 (the second embodiment), and FIG. 12 (the third embodiment). In addition, structure of the optical fiber feedthrough 411 and structure of the optical fiber feedthrough 410 may be made similar, one of which, the optical fiber feedthrough 410, is thus described here.

As illustrated in FIG. 15, two lead sections 410a, 410b of the optical fiber feedthrough 410 run through the main body section 410e, extending to the inner side and the outer side of the pressure-tight casing 402 illustrated in FIG. 14.

For the plurality of lead sections 410a, 410b, small-diameter parts 410c, 410d illustrated in FIG. 15 are formed on ends on the outer side of the pressure-tight casing 402. In addition, also for the plurality of lead sections 410a, 410b, small-diameter parts are formed on ends on the inner side of the pressure-tight casing 402. Note that the lead sections 410a, 410b are shaped like a tube in which hollow parts 410a-1, 410b-1 are formed.

Extension length L31 that one lead section 410a illustrated in FIG. 15 extends from the main body section 410e differs from extension length L32 of the other lead section 410b (L31≠L32). In addition, a relationship of the extension lengths as described above is true in both the inner side and the outer side of the pressure-tight casing 402 illustrated in FIG. 14. A difference in length between L31 and L32 only has to be equal to or larger than the thickness of a tool to be used, for example.

Note that the feedthroughs 100, 200, 300 in the first to third embodiments described above may be further placed in addition to the feedthroughs 410, 411 for optical fiber.

In addition, it may also be acceptable that the electric wire feedthroughs 100, 200, 300 are placed and that the feedthroughs for optical wire 410, 411 may be separated into two feedthroughs to which only one of the tail cables 412-1, 412-2, 413-1, 413-2 is connected.

For connection of the plurality of lead sections 410a, 410b with the tail cables 412-1, 412-2, the optical fibers of the tail cables 412-1, 412-2 are first inserted through the hollow parts 410a-1, 410b-1 of the lead sections 410a, 410b. With the optical fibers inserted through the lead sections 410a, 410b, the power feeding conductors around the optical fibers are connected to the lead sections 410a, 410b of the optical fiber feedthrough 410 via a brazing connection section or a crimping connection section, for example. Here, if crimping connection is performed, it is desirable to arrange a stainless core material between the optical fiber and the power feeding conductor so as to keep the optical fiber away from being collapsed due to the crimping connection.

As for the order of connecting the lead sections 410a, 410b, the lead section (410a, for example) having longer extension length, which is one example of the first lead section, may be firstly connected with the tail cable (412-1, for example), which is one example of the first cable. Then, the lead section (410b, for example) having shorter extension length, which is one example of the second lead section, may be connected with the tail cable (412-2, for example), which is one example of the second cable. In addition, the other processes of a manufacturing method of the submarine branching unit 401 are similar to those in the first embodiment, although the number of the bellows 406-1, 406-2 or the cable couplings 408-1, 408-2 placed for the branched submarine cables 1001-1, 1001-2 is increased by one.

The fourth embodiment described above may achieve effects similar to those in the first to third embodiments. More particularly, use of the fourth embodiment makes it possible to achieve effects such as an effect of facilitating the work to connect the tail cables 412-1, 412-2, 413-1, 413-2 to the plurality of lead sections 410a, 410b of the feedthroughs for optical wire 410, 411.

In addition, in the fourth embodiment, one example of a feedthrough is the optical fiber feedthroughs 410, 411 having the lead sections 410a, 410b connected to the optical fiber cables (tail cables 412-1, 412-2, 413-1, 413-2). Thus, the connection work to connect the lead sections 410a, 410b to the tail cables 412-1, 412-2, 413-1, 413-2 is facilitated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A repeater, comprising:
   a pressure-tight casing configured to be arranged on a seabed or in a sea; and
   a feedthrough having a plurality of leads including a central lead and a plurality of outer circumferential leads located on an outer circumferential side of the central lead, each of the plurality of leads being configured to connect a circuit housed in the pressure-tight casing with a cable outside the pressure-tight casing, wherein
   the feedthrough has an intermediate lead located on an outer circumferential side of the central lead and on a center side of the outer circumferential leads, and
   the intermediate lead is shorter in length than the central lead and longer in length than the outer circumferential leads.

2. The repeater according to claim 1, wherein a measuring device is connected to one end of the cable.

3. The repeater according to claim 1, wherein the plurality of outer circumferential leads are located on a concentric circle.

4. The repeater according to claim 1, wherein
   the feedthrough comprises a plurality of the intermediate leads, and
   the plurality of intermediate leads are located on a concentric circle.

5. The repeater according to claim 1, further comprising:
   a main body section which is placed in the pressure-tight casing and through which the plurality of leads pass, wherein
   the central lead is located at the center of the main body section.

6. The repeater according to claim 1, wherein the feedthrough is an electric wire feedthrough configured to connect the plurality of leads to electric wire cables.

7. The repeater according to claim 1, wherein the feedthrough is configured to connect the plurality of leads to optical fiber cables.

8. A feedthrough placed on a repeater which includes a pressure-tight casing configured to be arranged on a seabed or in a sea, the feedthrough comprising:
   a plurality of lead sections including a central lead section and a plurality of outer circumferential lead sections located on an outer circumferential side of the central lead section, each of the plurality of lead sections configured to connect a circuit housed in the pressure-tight casing with a cable outside the pressure-tight casing, wherein
   the feedthrough has an intermediate lead section located on an outer circumferential side of the central lead section and on a center side of the outer circumferential lead sections, and
   the intermediate lead section is shorter in length than the central lead section and longer in length than the outer circumferential lead sections.

9. A repeater manufacturing method for manufacturing a repeater including a pressure-tight casing to be arranged on a seabed or in a sea and a feedthrough having a plurality of lead sections including a central lead section and a plurality of outer circumferential lead sections located on an outer circumferential side of the central lead section, each of the plurality of lead sections configured to connect a circuit housed in the pressure-tight casing with a cable outside the pressure-tight casing, the feedthrough has an intermediate lead section located on an outer circumferential side of the central lead section and on a center side of the outer circumferential lead sections, and
   the intermediate lead section is shorter in length than the central lead section and longer in length than the outer circumferential lead sections, the repeater manufacturing method comprising:
   connecting a first lead section of the plurality of lead sections with a first cable in one of an inner side and an outer side of the pressure-tight casing; and
   thereafter, connecting a second lead section of the plurality of lead sections with a second cable in the one of the inner side and the outer side of the pressure-tight casing, the second lead section having a shorter length than the first lead section.

* * * * *